United States Patent
Klotz et al.

(10) Patent No.: US 9,557,168 B2
(45) Date of Patent: Jan. 31, 2017

(54) ULTRASONIC MEASURING SYSTEM HAVING A REDUCED MINIMUM RANGE AND METHOD FOR DETECTING AN OBSTACLE

(75) Inventors: Albrecht Klotz, Leonberg (DE); Dirk Schmid, Simmozheim (DE); Michael Schumann, Stuttgart (DE); Matthias Karl, Ettlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 517 days.

(21) Appl. No.: 14/117,128

(22) PCT Filed: Mar. 20, 2012

(86) PCT No.: PCT/EP2012/054907
§ 371 (c)(1),
(2), (4) Date: May 13, 2014

(87) PCT Pub. No.: WO2012/152493
PCT Pub. Date: Nov. 15, 2012

(65) Prior Publication Data
US 2014/0331772 A1    Nov. 13, 2014

(30) Foreign Application Priority Data

May 9, 2011   (DE) .................. 10 2011 075 484

(51) Int. Cl.
*G01N 29/04*   (2006.01)
*G01B 17/00*   (2006.01)
(Continued)

(52) U.S. Cl.
CPC .............. *G01B 17/00* (2013.01); *G01S 7/527* (2013.01); *G01S 7/529* (2013.01); *G01S 7/5345* (2013.01); *G01V 1/00* (2013.01)

(58) Field of Classification Search
CPC .......... G01B 17/00; G01S 7/527; G01S 7/529; G01S 7/534; G01S 7/52
(Continued)

(56) References Cited

U.S. PATENT DOCUMENTS 3,991,607 A * 11/1976 Niklas ................ G01N 29/0618
73/602
6,167,759 B1 * 1/2001 Bond ..................... A22B 5/007
600/437

(Continued)

FOREIGN PATENT DOCUMENTS

CN      101246213 A      8/2008
CN      101292880 A      10/2008
(Continued)

OTHER PUBLICATIONS

International Search Report for PCT/EP2012/054907, issued on Jun. 22, 2012.

*Primary Examiner* — Helen Kwok
(74) *Attorney, Agent, or Firm* — Norton Rose Fulbright US LLP; Gerard Messina

(57) ABSTRACT

An ultrasonic measuring system is described for detecting an obstacle using a resonant transducer element for transmitting an ultrasonic pulse and for generating a received signal which includes the ultrasonic echo pulse reflected from the obstacle, the transducer element generating a decay signal having its resonance frequency after transmitting an ultrasonic pulse. The ultrasonic measuring system includes an evaluation unit having a control unit which is designed to activate the transducer element for transmitting the ultrasonic pulse with the aid of a frequency-modulated transmitted signal generated by the control unit, the frequency modulation taking place with the aid of a modulation signal in such a way that the signature of the ultrasonic pulse differs from that of the decay signal. The evaluation unit is designed
(Continued)

to recognize the echo pulse based on an evaluation of a correlation signal which is generated with the aid of at least one correlation filter and which originates from the correlation of the signal generated by the resonant transducer element with the transmitted signal. Furthermore, a corresponding method is provided for detecting an obstacle with the aid of ultrasound, as well as a vehicle assistance system having the ultrasonic measuring system.

16 Claims, 2 Drawing Sheets

(51) Int. Cl.
  *G01S 7/527* (2006.01)
  *G01S 7/529* (2006.01)
  *G01S 7/534* (2006.01)
  *G01V 1/00* (2006.01)
(58) Field of Classification Search
  USPC .......................................................... 73/602
  See application file for complete search history.

(56) References Cited

U.S. PATENT DOCUMENTS

| 2003/0133362 | A1 | 7/2003 | Fortuna et al. | |
| 2008/0269612 | A1* | 10/2008 | Kunita | A61B 8/06 600/455 |
| 2010/0080083 | A1* | 4/2010 | Oswal | G01S 7/52033 367/98 |
| 2013/0283916 | A1* | 10/2013 | Hersey | G01N 29/11 73/587 |

FOREIGN PATENT DOCUMENTS

| CN | 101294796 A | | 10/2008 |
| CN | 101487893 A | | 7/2009 |
| CN | 201196682 Y | | 2/2011 |
| DE | 10103936 | | 1/2002 |
| JP | S62-293175 A | | 12/1987 |
| JP | 04-363998 | * | 12/1992 |
| JP | 05-232242 | * | 9/1993 |
| JP | 7104063 | | 4/1995 |
| JP | 10-268035 | * | 10/1998 |

* cited by examiner

ULTRASONIC MEASURING SYSTEM HAVING A REDUCED MINIMUM RANGE AND METHOD FOR DETECTING AN OBSTACLE

FIELD OF THE INVENTION

The present invention relates to an ultrasonic measuring system for detecting an obstacle using a resonant transducer element for transmitting an ultrasonic pulse and for receiving an ultrasonic echo pulse reflected from the obstacle. The present invention also relates to a vehicle having such an ultrasonic measuring system and a method for detecting an obstacle with the aid of ultrasound.

BACKGROUND INFORMATION

Ultrasound-based measuring systems are used to measure a distance from an object located ahead of a sensor. The used ultrasonic sensors are generally based on the pulse-echo method. During this operation, the sensor transmits an ultrasonic pulse and measures the reflection of the ultrasonic pulse (echo) caused by an object. The distance between the sensor and the object is computed via the measured echo transmission time and the speed of sound.

To measure the distance, the analog echo signal is evaluated in such a way that a valid echo is present exactly at the time when the measured voltage of the echo pulse exceeds a threshold value for an established minimum time period.

The ultrasonic sensors are used here as a transceiver unit. The sensors include a resonant transducer element whose emission frequency is coordinated with the resonance frequency of the transducer.

Due to the resonant character of the transducer, transient oscillations and decays result during the transmission excitation. In particular, the decay processes result in a dead time during which it is not possible to detect the echoes. This dead time is equivalent to a minimum range for the sensor which can presently not be fallen below.

It would be desirable to reduce the minimum range.

It is also known how the dead time may be reduced by a frequency-modulated excitation if, instead of excitation using the resonance frequency of the transducer, a special excitation outside of the resonance, in particular at the end of the excitation, takes place in a targeted manner. Such an excitation of the transducer using a constant frequency, which is different from the resonance frequency, in particular at the end of the excitation, is known from German Patent No. 101 03 936, for example. In this way, the initial amplitudes for the decay may be reduced and thus also the decay time. The disadvantage here is that such ultrasonic measuring systems are designed to generate very special forms of transmission and are thus limited to these very special forms of transmission.

SUMMARY

The ultrasonic measuring system according to the present invention for detecting an obstacle using an ultrasonic sensor has a resonant transducer element for transmitting an ultrasonic pulse and for generating a received signal which includes the ultrasonic pulse which is reflected from the obstacle and referred to as echo pulse. The resonant transducer element then generates a decay signal having its resonance frequency after transmitting the ultrasonic pulse. Also, the ultrasonic measuring system includes an evaluation unit having a control unit which is designed to activate the resonant transducer element to transmit the ultrasonic pulse with the aid of a transmitted signal generated by the control unit. Furthermore, the control unit of the ultrasonic measuring system is designed to generate a frequency-modulated transmitted signal with the aid of a modulation signal in such a way that the signature of the ultrasonic pulse differs from that of the decay signal. The evaluation unit has at least one correlation filter, the at least one correlation filter being designed to correlate the signal generated by the resonant transducer with the transmitted signal and to generate a corresponding correlation signal. The evaluation unit is furthermore designed to recognize an echo pulse generated by the obstacle in the presence of a level exceeding a threshold value or of a maximum of the correlation signal and to compute a distance from the obstacle using a time period between the transmitted ultrasonic pulse and the received echo pulse.

According to the present invention, a method for detecting an obstacle with the aid of ultrasound is furthermore provided. In the method according to the present invention, an ultrasonic pulse is transmitted with the aid of a resonant transducer element, a received signal, which includes the ultrasonic pulse which is reflected from the obstacle and referred to as an echo pulse, is generated with the aid of the resonant transducer element, a decay signal having the resonance frequency of the resonant transducer element being generated by the resonant transducer element after the transmission of the ultrasonic pulse, and a transmitted signal being generated using which the resonant transducer element is activated to transmit the ultrasonic pulse. Furthermore, the frequency of the transmitted signal is modulated with the aid of a modulation signal in such a way that the signature of the ultrasonic pulse differs from that of the decay signal. The signal generated by the resonant transducer element is correlated with the transmitted signal with the aid of the correlation function of a correlation filter to obtain a corresponding correlation signal. Here, the echo pulse is recognized in the presence of a level exceeding a threshold value or of a maximum of the correlation signal, and a distance from the obstacle is computed using a time period between the transmitted ultrasonic pulse and the received echo pulse and the speed of the ultrasound.

In the ultrasonic measuring system according to the present invention, the activation frequency is selected in such a way that the transmitted signal contains a suitable frequency-modulated encoding, i.e., a signature. The frequency-modulated encoding was selected according to the present invention in such a way that the greatest possible discrepancy exists between the transmitted signal and the decay.

In one particularly advantageous specific embodiment of the present invention, the transmitted signal is modulated with the aid of a modulation signal in which the frequency changes within a frequency range including frequency values, each of which differs from the resonance frequency of the resonant transducer element. Furthermore preferably, the modulation signal has a frequency which continuously changes over time. In contrast to the activation at a constant frequency, the ultrasonic sensor is operated in this preferred specific embodiment of the present invention in such a way that a characteristic frequency mixture is emitted. Furthermore preferably, a chirp, in particular a linear or a non-linear chirp, is used as the modulation signal.

In one very advantageous specific embodiment of the present invention, at least one correlation filter is designed as a digital correlation filter, and the evaluation unit includes an analog-digital converter or at least one comparator for converting one of the signals generated by the resonant transducer element into a digital signal and for transmitting the digital signal to the digital correlation filter.

According to the present invention, the encoding of the transmitted signal is detected in the received signal by suitable digital processing, in particular by using a digital correlation filter, and separated from the decay signal which has the (resonance) frequency of the transducer.

The analog received signal is converted into a digital signal (A/D) and subsequently passes through a digital signal-adapted filter. This filter is implemented as a digital correlation filter, in particular as a cross-correlation filter or matched filter.

An echo pulse is now present exactly at the time when the measure for the correlation between the transmitted signal and the signal generated by the resonant transducer and containing the received signal is at its maximum, i.e., exceeds a certain threshold. In this way, comparably small echo pulses may also be separated from the considerably larger amplitudes of the decay signal. The signal frequency is used as the differentiation characteristic between the echo pulse and the decay signal. The frequency of the echo pulse reflects the modulated transmission frequency, and the decay of the transducer takes place at its natural frequency.

With the aid of the ultrasonic measuring system according to the present invention, echoes also become detectable which are superimposed on the decay of the transducer. In this way, the dead time range may be further reduced. Due to the measurement in the post-pulse oscillation range of the resonant transducer proposed here, it is possible to further reduce the reduction of the minimum range of the ultrasonic sensor.

The present invention may be used independently of the selected transmission pulse duration and transmission amplitude. It results in a reduction of the decay window in any case.

In one advantageous embodiment of the present invention, the frequency-modulated transmitted signal is selected in such a way that the end frequency is at the greatest possible distance from the resonance frequency, so that the initial decay amplitudes are reduced and the oscillation thus decays faster.

In one particularly preferred specific embodiment of the present invention, in which a chirp is used as the modulation signal of the transmitted signal, the ultrasonic measuring system according to the present invention is designed to detect the obstacle in the presence of a relative motion which took place at at least a relative velocity between the ultrasonic measuring system and the obstacle. Here, the evaluation unit is designed to recognize an echo pulse based on the correlation signal generated by at least one matched filter used as a correlation filter.

If the transmitter and/or an optionally present object, which reflects the signal, and/or the receiver move in relation to one another, a spectral change of the signals, also known as the Doppler effect, takes place. This Doppler shift also takes place when chirps are used as modulation signals whose carrier frequency does not change proportionally in relation to time. Such chirps are therefore referred to as non-linear chirps. When non-linear chirps are used as modulation signals, multiple of the matched filters corresponding to the particular relative velocity are necessary to ensure reliable detection of the correlation maximum. When linear chirps are used as modulation signals, it is still possible to determine a correlation maximum in one and the same digital matched filter despite the Doppler shift, which makes the use of this form of transmitted signal particularly advantageous under this special aspect.

Preferably, the evaluation unit includes an amplifier for amplifying the signal generated by the resonant transducer element, the amplifier being designed to generate such an amplification of the signal generated by the resonant transducer, in particular such a reduced, constant amplification of the signal generated by the resonant transducer, or such an amplification, which increases over time, preferably increases linearly over time, of the signal generated by the resonant transducer in the decay window of the resonant transducer that overmodulation of the amplified signal generated by the resonant transducer in the decay window of the resonant transducer or overmodulation of the amplified signal generated by the resonant transducer having a reduced amplitude in the decay window of the resonant transducer, or overmodulation of the amplified signal generated by the resonant transducer for a shorter time period in the decay window of the resonant transducer does not occur.

In some implementations, constant amplification is selected. This may result in saturation or overmodulation in the decay window depending on the amplifier design or the design of the analog-digital converter (A/D converter design). The signal analysis is thus disrupted. One advantageous embodiment of the present invention results from either the selection of a constant but reduced amplification in the decay window or from the selection of an amplification depending on the propagation time, in particular an amplification which increases linearly over time. According to the present invention, the amplification is selected in such a way that overmodulation is avoided or at least reduced in the amplitude or delimited to a shorter time period.

Another advantageous effect of the present invention is the improvement of the signal compared to the floor conditions in a so-called measuring window, i.e., also outside of the decay window. In this way, the recognition of poorly reflective objects is improved and also the maximum range is increased.

According to the present invention, a vehicle is provided, in particular, having a vehicle assistance system having an ultrasonic measuring system according to the present invention. The driver of such a vehicle may then be warned in a timely manner upon recognition of an obstacle. In particular, the vehicle assistance system according to the present invention may be designed to intervene in the vehicle dynamics upon recognition of an obstacle. As a result, the collision risk of the vehicle according to the present invention is considerably reduced, in particular during parking.

DETAILED DESCRIPTION

Figure 1:
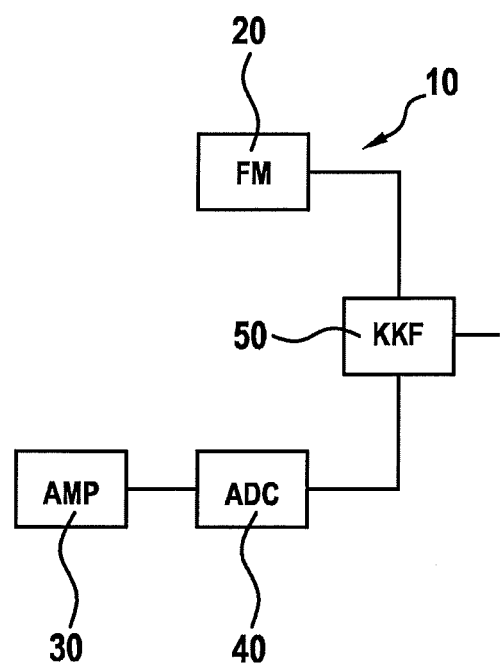
FIG. 1 shows a block diagram of an evaluation unit of an ultrasonic system having a resonant transducer element according to a first specific embodiment of the present invention, the evaluation unit including a control unit, an amplifier, and a cross-correlation filter.

FIG. 1 shows a block diagram of an evaluation unit 10 of an ultrasonic measuring system (not illustrated) having a resonant transducer element (not illustrated) according to a first specific embodiment of the present invention, including a control unit 20, an amplifier 30, an analog-digital converter 40, and a cross-correlation filter 50, a pattern of the frequency-modulated transmission pulse being stored in the control unit.

The ultrasonic sensor (not illustrated) of the ultrasonic measuring system transmits with the aid of the resonant transducer element an ultrasonic pulse which is reflected from an obstacle (not illustrated) and received by the ultrasonic sensor as an echo pulse. The resonant transducer element generates a received signal which includes the echo pulse. Since the ultrasonic sensor is in the decay phase with its resonance frequency after the transmission of the transmission pulse, and a corresponding decay signal is generated, the received signal including the echo pulse overlaps with the decay signal of the resonant transducer. The signal generated by the resonant transducer is amplified with the aid of amplifier 30 (AMP) present in the echo path and subsequently passes through analog-digital converter 40 (ADC) which is also present in the echo path and which converts the analog signal generated by the resonant transducer into a digital signal. Alternatively to ADC 40, one or multiple comparators may be provided in order to convert the analog signal generated by the resonant transducer into a digital signal. The digitized signal then reaches the digital cross correlation filter 50 by which it is correlated with the frequency-modulated transmission pulse.

Resonant transducers have the disadvantage that they have a relatively long decay phase and are blind for reception during this decay phase according to the related art. In particular, the measured amplitudes are saturated, i.e., cut off, during the decay phase due to the existing amplifier circuits. By selecting a transmitted signal having a signature which differs from the resonance signature, and by using a suitable correlation filter 50 (matched filter) in the reception path, it is possible to measure into the saturation range, so that the minimum range is considerably improved compared to the one known from the related art despite longer pulses. Ultrasonic sensors are known from the related art which have a pulse duration of 300 μs and a minimum range of 20 cm. The ultrasonic sensor according to the present invention was proven to have a pulse duration of 500 μs and a minimum range of 15 cm.

Figure 2:
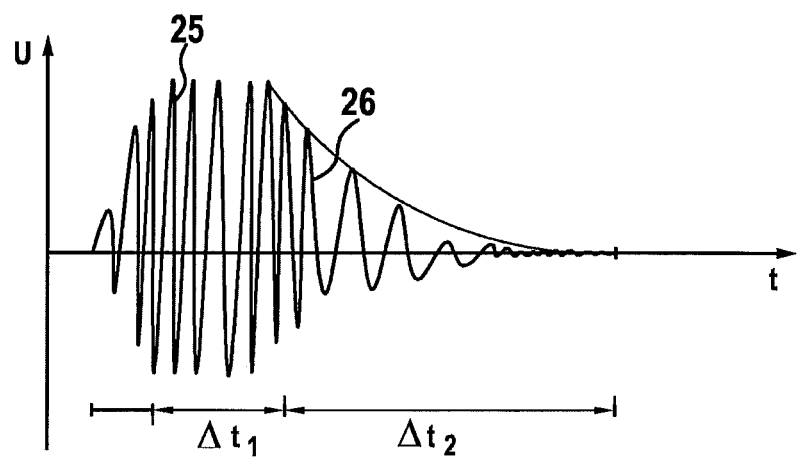
FIG. 2 shows a transmitted signal having the corresponding decay phase generated by the ultrasonic system according to the first specific embodiment of the present invention.

FIG. 2 illustrates the chronological dependence of a transmitted signal 25, having the corresponding decay phase, generated by the ultrasonic measuring system according to the first specific embodiment of the present invention. In this case, transmitted signal 25 was modulated with the aid of a chirp having a frequency which changes continuously over time in a frequency range which includes frequency values, each of which differs from the resonance frequency of the resonant transducer.

Transmitted signal 25 having the corresponding decay signal 26 is represented as voltage U as a function of time t. Transmitted signal 25 is transmitted during time period $\Delta t_1$. Decay signal 26 extends over time period $\Delta t_2$.

Figure 3:
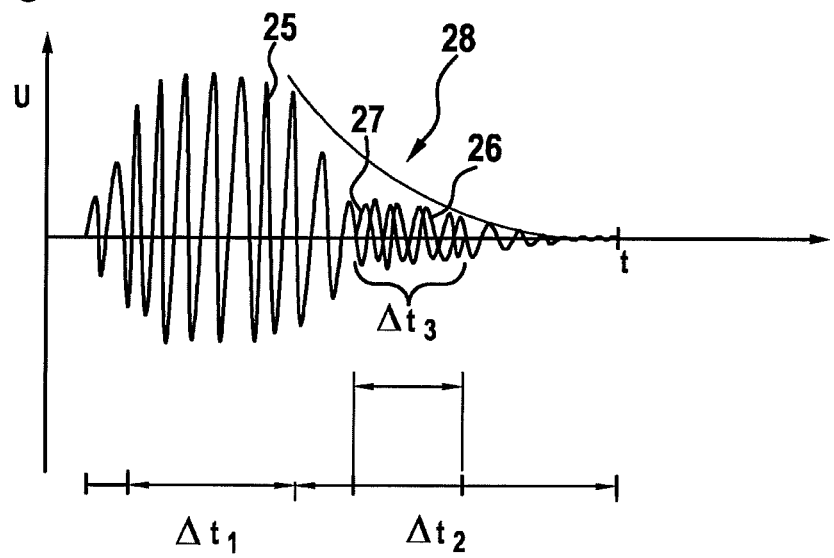
FIG. 3 shows a schematic illustration of a transmitted signal, which has an overlapped received signal including the echo pulse during the decay phase, generated by the ultrasonic system according to the first specific embodiment of the present invention.

FIG. 3 shows transmitted signal 25 generated by the ultrasonic system according to the first specific embodiment of the present invention and decay signal 26 having a superimposed received signal 27, including the echo pulse, in a schematic illustration. Transmitted signal 25 having the corresponding decay signal 26 is represented as voltage U as a function of time t, similarly to FIG. 1. Transmitted signal 25 is transmitted during time period $\Delta t_1$. Decay signal 26 extends during time period $\Delta t_2$. During time period $\Delta t_3$, which is within time period $\Delta t_2$, received signal 27, which includes the echo pulse, is superimposed by decay signal 26 and thus generates a signal 28 generated by the transducer.

Figure 4:
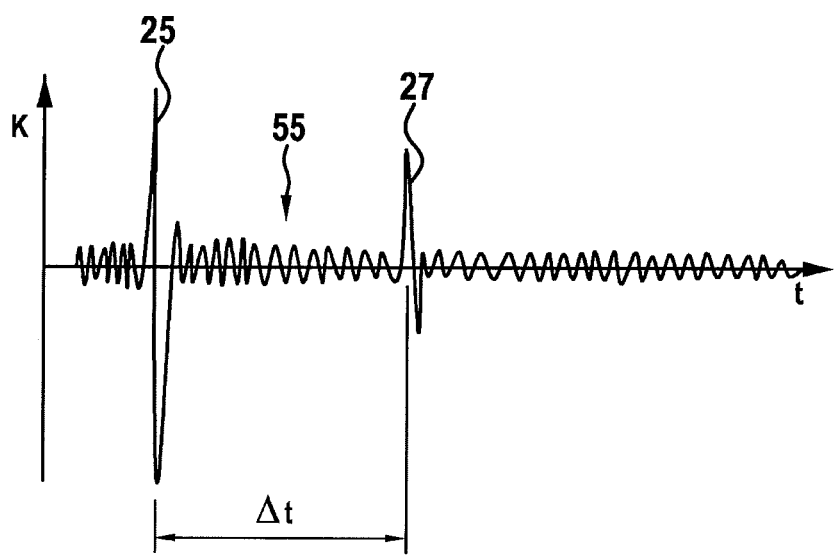
FIG. 4 shows a correlation signal generated by the correlation filter of the ultrasonic system according to the first specific embodiment of the present invention, the correlation signal representing the signal generated by the resonant transducer element after the correlation with the transmitted signal.

FIG. 4 shows a correlation signal 55 generated by correlation filter 50 of the ultrasonic system according to the first specific embodiment of the present invention, the correlation signal corresponding to signal 28 generated by the resonant transducer after the correlation with transmitted signal 25.

Signal 28 generated by the resonant transducer includes received signal 27, which includes the echo pulse, and decay signal 26.

FIG. 4 shows correlation signal 55 (K) as the function of time t.

Correlation signal 55 shows two maxima. Transmitted signal 25 is to be found at the first maximum, and received signal 27 which includes the echo pulse is to be found at the second maximum. Time distance Δt between the two maxima represents the elapsed time between the transmitted ultrasonic pulse and the received echo pulse.

In addition to the aforementioned written disclosure, reference is additionally made to the illustrations in FIGS. 1 through 4 for additional disclosure of the present invention.

What is claimed is:

1. An ultrasonic measuring system for detecting an obstacle, comprising:
    an ultrasonic sensor having a resonant transducer element for transmitting an ultrasonic pulse and for generating a received signal which includes an echo pulse including the ultrasonic pulse which is reflected from the obstacle, wherein the resonant transducer element generates a decay signal having a resonance frequency after transmitting the ultrasonic pulse; and
    an evaluation unit including a control unit for controlling the resonant transducer element for transmitting the ultrasonic pulse with an aid of a transmitted signal generated by the control unit, wherein:
        the control unit generates a frequency-modulated transmitted signal with an aid of a modulation signal in such a way that a signature of the ultrasonic pulse differs from that of the decay signal,
        the evaluation unit includes at least one correlation filter that correlates a signal generated by the resonant transducer element with the transmitted signal and at the same time generates a corresponding correlation signal,
        the evaluation unit recognizes the echo pulse in a presence of one of a level exceeding a threshold value and a maximum of the correlation signal, and
        the evaluation unit computes a distance from the obstacle using a time period between the transmitted ultrasonic pulse and the received echo pulse and a speed of an ultrasound.

2. The ultrasonic measuring system as recited in claim 1, wherein a frequency of the modulation signal changes within a frequency range which includes frequency values, each of which differs from the resonance frequency of the resonant transducer element.

3. The ultrasonic measuring system as recited in claim 1, wherein a frequency of the modulation signal continuously changes over time.

4. The ultrasonic measuring system as recited in claim 1, wherein:
the at least one correlation filter includes a digital correlation filter, and
the evaluation unit includes one of an analog-digital converter and at least one comparator to convert the received signal generated by the resonant transducer element into a digital signal and to transmit the digital signal to the digital correlation filter.

5. The ultrasonic measuring system as recited in claim 1, wherein the at least one correlation filter includes a cross-correlation filter.

6. The ultrasonic measuring system as recited in claim 5, wherein the cross-correlation filter includes a matched filter.

7. The ultrasonic measuring system as recited in claim 1, wherein the control unit generates the frequency-modulated transmitted signal with an aid of a chirp as the modulation signal.

8. The ultrasonic measuring system as recited in claim 7, wherein the evaluation unit detects the obstacle in a presence of a relative motion taking place at at least a relative velocity between the ultrasonic measuring system and the obstacle based on the correlation signal generated with an aid of the at least one correlation filter.

9. The ultrasonic measuring system as recited in claim 1, wherein:
the evaluation unit includes an amplifier for amplifying the received signal generated by the resonant transducer element, and
the amplifier generates an amplification of the received signal generated by the resonant transducer element, the amplification corresponding to one of (1) a reduced, constant amplification of the received signal generated by the resonant transducer element, and (2) an amplification that increases linearly over time in a decay window of the resonant transducer element, such that overmodulation of the amplified signal generated by the resonant transducer element in the decay window of the resonant transducer element, or overmodulation of the amplified signal generated by the resonant transducer element having a reduced amplitude in the decay window of the resonant transducer element, or overmodulation of the amplified signal generated by the resonant transducer element for a shorter time period in the decay window of the resonant transducer element does not occur.

10. A method for detecting an obstacle with an aid of ultrasound in an ultrasonic measuring system, comprising:
transmitting an ultrasonic pulse with an aid of a resonant transducer element;
generating, with an aid of the resonant transducer element, an echo pulse including a received signal that includes the ultrasonic pulse and is reflected from the obstacle;
generating a decay signal having a resonance frequency of the resonant transducer element by the resonant transducer element after the transmission of the ultrasonic pulse;
generating a transmitted signal via which the resonant transducer element is activated to transmit the ultrasonic pulse;
modulating the transmitted signal with an aid of a modulation signal in such a way that a signature of the ultrasonic pulse differs from that of the decay signal which is correlated by a signal generated by the resonant transducer element with the transmitted signal, to obtain a corresponding correlation signal;
recognizing the echo pulse in a presence of a level exceeding one of a threshold value and a maximum of the correlation signal; and
computing a distance from the obstacle using a time period between the transmitted ultrasonic pulse and the echo pulse and a speed of the ultrasound.

11. The method as recited in claim 10, wherein a frequency of the modulation signal changes within a frequency range which includes frequency values, each of which differs from the resonance frequency of the resonant transducer element.

12. The method as recited in claim 10, wherein a frequency of the modulation signal is continuously changed over time.

13. The method as recited in claim 10, wherein the frequency-modulated transmitted signal is generated with an aid of a chirp as the modulation signal.

14. The method as recited in claim 13, wherein the obstacle is detected in a presence of a relative motion taking place at at least a relative velocity between the ultrasonic measuring system and the obstacle based on the correlation signal generated with an aid of a correlation function of at least one correlation filter.

15. The method as recited in claim 10, wherein the received signal generated by the resonant transducer element is amplified according to an amplification corresponding to one of (1) a reduced, constant amplification of the received signal generated by the resonant transducer element, and (2) an amplification that increases linearly over time in a decay window of the resonant transducer element, such that overmodulation of the amplified signal generated by the resonant transducer element in the decay window of the resonant transducer element, or overmodulation of the amplified signal generated by the resonant transducer element having a reduced amplitude in the decay window of the resonant transducer element, or overmodulation of the amplified signal generated by the resonant transducer element for a shorter time period in the decay window of the resonant transducer element does not occur.

16. A vehicle having a vehicle assistance system, comprising:
an ultrasonic measuring system for detecting an obstacle, including:
an ultrasonic sensor having a resonant transducer element for transmitting an ultrasonic pulse and for generating a received signal which includes an echo pulse including the ultrasonic pulse which is reflected from the obstacle, wherein the resonant transducer element generates a decay signal having a resonance frequency after transmitting the ultrasonic pulse; and
an evaluation unit including a control unit for controlling the resonant transducer element for transmitting the ultrasonic pulse with an aid of a transmitted signal generated by the control unit, wherein:
the control unit generates a frequency-modulated transmitted signal with an aid of a modulation signal in such a way that a signature of the ultrasonic pulse differs from that of the decay signal, the evaluation unit includes at least one correlation filter that correlates a signal generated by the resonant transducer element with the transmitted signal and at the same time generates a corresponding correlation signal, the evaluation unit recognizes the echo pulse in a presence of one of a level exceeding a threshold value and a maximum of the correlation signal, and the evaluation unit computes a distance from the obstacle using a time period between the transmitted ultrasonic pulse and the received echo pulse and a speed of an ultrasound.

* * * * *